(12) United States Patent
Keyes

(10) Patent No.: US 7,418,979 B2
(45) Date of Patent: Sep. 2, 2008

(54) METHOD AND APPARATUS FOR PREVENTING FOAM DISBONDMENT

(75) Inventor: Thomas Joseph Keyes, Fort Worth, TX (US)

(73) Assignee: Thermacor Process, L.P., Fort Worth, TX (US)

( * ) Notice: Subject to any disclaimer, the term of this patent is extended or adjusted under 35 U.S.C. 154(b) by 163 days.

(21) Appl. No.: 11/655,446

(22) Filed: Jan. 19, 2007

(65) Prior Publication Data

US 2008/0173367 A1    Jul. 24, 2008

(51) Int. Cl.
*F16L 9/22*   (2006.01)
(52) U.S. Cl. .................... 138/120; 138/149; 138/155; 138/118; 138/145; 285/45; 285/228; 285/299
(58) Field of Classification Search ................. 138/120, 138/155, 149, 145, 146, 114, 118; 285/45, 285/299, 301, 302, 226, 228; 405/38
See application file for complete search history.

(56) References Cited

U.S. PATENT DOCUMENTS

| | | | | |
|---|---|---|---|---|
| 2,903,018 A | * | 9/1959 | Goff | 138/140 |
| 4,084,842 A | * | 4/1978 | Stonitsch et al. | 285/47 |
| 4,350,372 A | * | 9/1982 | Logsdon | 285/45 |
| 5,058,934 A | * | 10/1991 | Brannon | 285/226 |
| 6,910,506 B2 | * | 6/2005 | Gabriel et al. | 138/114 |
| 7,032,621 B2 | * | 4/2006 | Keyes | 138/120 |

* cited by examiner

*Primary Examiner*—Patrick F Brinson
(74) *Attorney, Agent, or Firm*—Charles D. Gunter, Jr.

(57) ABSTRACT

The present invention relates generally to an apparatus and method for preventing disbondment in an insulated piping system that is used for conveying high temperature fluids. More specifically, an external slip wrap is shown, capable of surrounding the outer protective jacket of the insulated piping system at a location along the piping before an elbow shaped or angular change in direction. The slip wrap comprises a loosely received outer sleeve which surrounds the outer protective jacket of the piping without being bonded thereto, thereby allowing the insulated and jacketed pipe to move axially relative to the slip wrap for a selected distance once the pipe is buried in the ground.

13 Claims, 2 Drawing Sheets

METHOD AND APPARATUS FOR PREVENTING FOAM DISBONDMENT

BACKGROUND OF THE INVENTION

1. Field of the Invention

The present invention relates generally to an apparatus and method for preventing disbondment in a bonded foam insulated piping system of the type used for conveying high temperature fluids.

2. Description of the Prior Art

Insulated pipelines are needed in a variety of situations. For example, distributed HVAC (heating, ventilation, and air conditioning) applications utilize chilled water for cooling and steam for heating. The chiller and boiler are typically contained in a central location and the chilled water and steam are distributed to other locations. For example, on a school campus the chiller and boiler may be located in a power plant building. The chilled water and steam are distributed to classrooms in separate buildings. A set of insulated pipelines is used to convey the chilled water from the chiller to other locations and back to the chiller. Another set of insulted pipelines is used to carry the steam from the boiler to the other locations and back to the boiler. Oftentimes, the temperature inside the pipe is either higher or lower than the ambient temperature surrounding the pipe. It is necessary for the pipes to be insulated in order to retain the internal temperature of the fluids and keep heating and cooling losses at a minimum. The insulated pipelines are usually located underground.

Insulated pipe of the type under consideration is conventional and commercially available. There are predominately two types of piping systems in use: Class-A drainable dryable testable (DDT); and polyurethane or polyisocyanurate bonded foam systems. The present application is directed toward the bonded foam type system. These systems utilize a steel pipe to convey fluid, and often the fluid is a different temperature as compared to the ambient environment. Around the outside of the steel pipe is a layer of insulating foam such as, for example, polyisocyanurate foam. In the case of high temperature piping systems, the insulating foam serves to keep heat loss from the starting location of the pipeline to the ending location at a minimum. Around the outside of the foam is a thin jacket of thermoplastic material, such as high density polyethylene (HDPE). The plastic jacket protects the foam from mechanical damage and also provides a watertight seal to prevent corrosion of the steel pipe. Although steel is commonly used for the inner pipe which carries the media to be piped, copper, aluminum or other metals as well as fiberglass, PVC, and similar materials may be utilized, as well.

The most important engineering criteria for a foam system of the type under consideration is that it must be treated as a bonded system. In other words, the foam is bonded to both the carrier pipe and the outer jacket. In such a case, the bonded system acts as a monolithic unit moving underground. Higher temperatures can act adversely upon the bonded foam system, however. The hot fluid in the steel carrier pipe causes the carrier pipe to thermally expand. At temperatures of 400° F. this expansion is on the order of 2.8 inches per 100 feet of pipe. This expansion is not a problem as long as the system remains bonded and the carrier pipe, foam and jacket move together as one unit underground. This movement is controlled by the expansion force of the steel carrier pipe, but it is the bond strength of the foam to the pipe and jacket that is important in keeping the system moving together. This monolithic movement of the system occurs along each incremental length of a particular run, and as long as total movement is not greater than 4 to 6 inches and the system remains bonded, no undue stress is subjected at any one point of the jacket. If the system were to disbond, however, the surrounding soil would fix the jacket in place and the carrier pipe would still thermally expand thereby pushing through and destroying the jacket at the first change of direction.

Generally speaking, the proper choice of insulating materials can counteract many of the thermal expansion effects discussed above. It has been well established by industry case history that the polyurethane foam bond for systems running at 250° F. to 300° F. is strong enough to keep the entire system acting as a bonded system. However, for systems running above these temperatures a higher temperature rated foam, such as polyisocyanurate foam, is generally required. Even in systems utilizing "high temperature" polyisocyanurate foam, the higher heat can, in some instances, begin to fry the foam at the foam/carrier pipe interface, thereby bringing into question the strength of the foam bond to the steel carrier pipe.

Various approaches have been taken to control this undesirable expansion in insulated pipe systems of the type under consideration. For example, expansion "bolster" materials are supplied in the form of resilient pads which can be used at elbows or expansion loops. These pads are placed adjacent to the piping and create a cushion which acts as a stress relief area in critical areas, such as angles and elbows.

Despite the advances seen in the high temperature piping industry, a need continues to exist for improved systems for preventing disbondment in bonded foam insulated piping systems.

A need also exists for such an improved system which utilizes many of the conventionally available materials and manufacturing techniques commonly used in the industry.

A need also exists for such a system which is simple in design and economical to implement.

SUMMARY OF THE INVENTION

The method and apparatus of the present invention provide an improved insulated piping system for conveying high temperature fluids. The insulated piping system has a first and second length of insulated and jacketed pipe, each having a joining end to be joined to an end of the other length, and each pipe length comprises an inner carrier pipe having an interior surface and an exterior surface. An envelope of foamed insulation surrounds the inner pipe exterior surface, and an outer protective jacket surrounds the envelope of insulation. The joining ends of adjacent pipe lengths are welded together to form fixed joints, whereby the adjacent pipe lengths provide a continuous length of fluid conduit for conveying high temperature fluids.

In addition, a discrete length of an external slip wrap is placed at a selected location along the length of the piping system, generally in a location at which the piping encounters an angular change of direction, such as at an elbow or expansion loop. The slip wrap comprises a loosely received outer sleeve for the piping which surrounds the outer protective jacket without being bonded thereto, whereby the insulated and jacketed pipe can move axially relative to the slip wrap for a selected distance once the pipe is buried in the ground. Preferably, the external slip wrap is a thin sleeve formed of a flexible plastic type material, such as a polyolefin material having characteristic coefficient of friction which allows the jacketed pipe to slide within the sleeve. In one preferred form of the invention, the external slip wrap may be formed of polyethylene.

The location of the slip wrap along the length of piping is selected to in order to prevent disbondment of the foam insulation from the inner carrier pipe. Prevention of disbondment is possible by allowing relative movement of the pipeline relative to the surrounding earth, thereby eliminating the separation of the envelope of foamed insulation from the exterior surface of the inner metal pipes as the temperature of the inner metal pipes increase and the pipeline expands. In a typical case, the lengths of insulated piping are part of a pipeline conveying steam, hot water or other hot fluids at a temperature in the range of above about 200° F.

Additional objects, features and advantages will be apparent in the written description which follows.

DETAILED DESCRIPTION OF THE INVENTION

Figure 1:
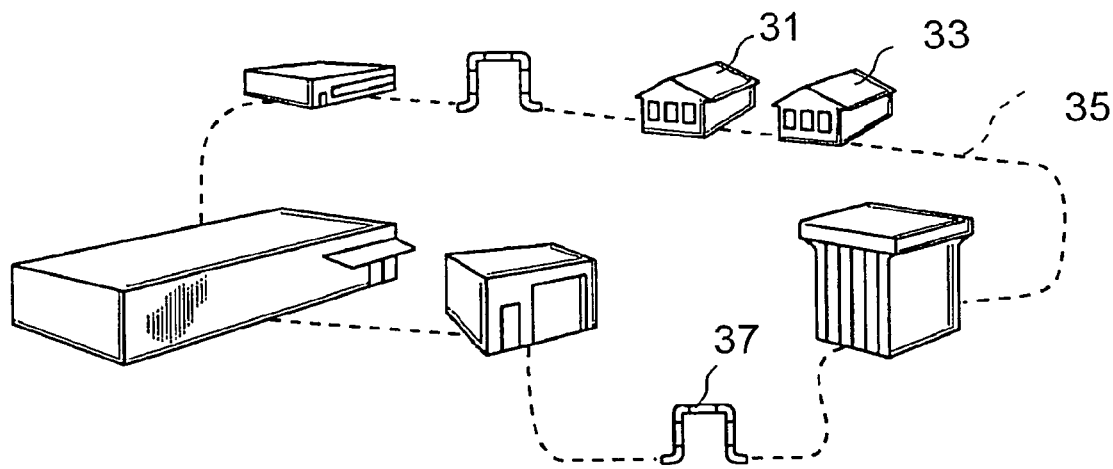
FIG. 1 is a simplified representation of a typical distributed HVAC system utilizing chilled water for cooling and steam for heating.
Figure 2:
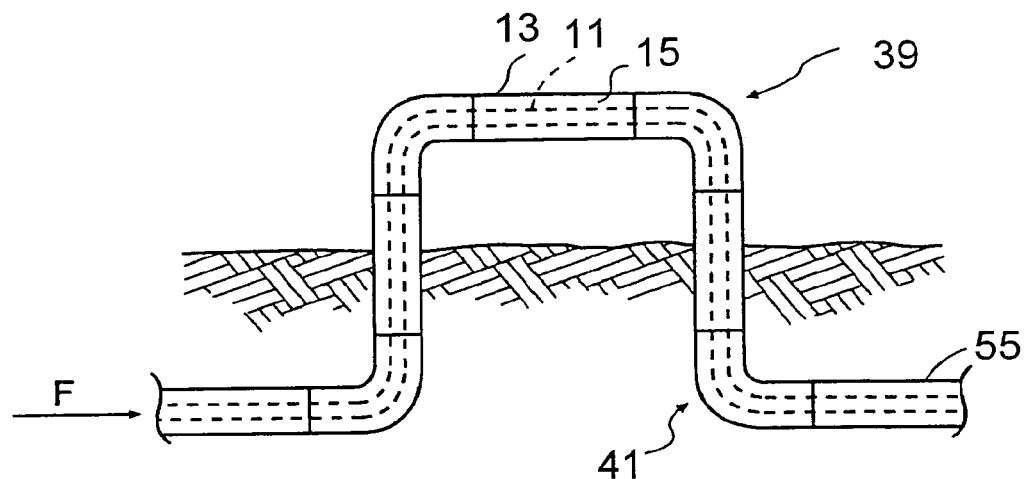
FIG. 2 is a schematic representation of an expansion loop in a pre-insulated pipeline prior to thermal expansion.
Figure 3:
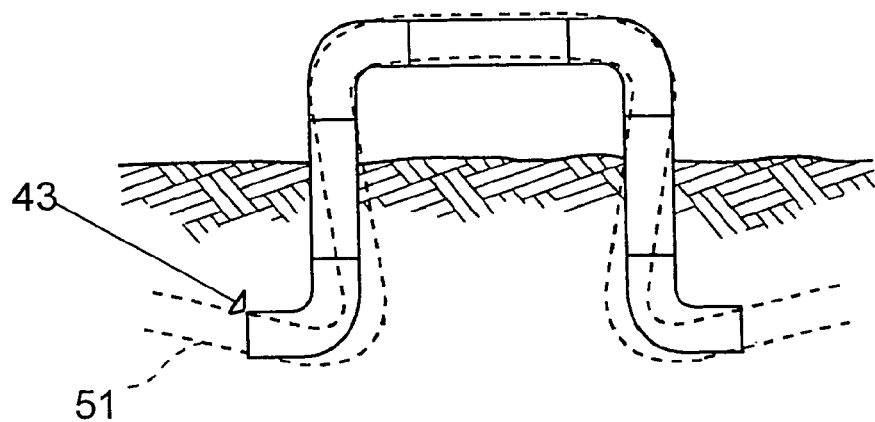
FIG. 3 is a schematic view of the pipeline of FIG. 2 under the influence of thermal expansion forces.

Turning first to FIGS. 1-3, there is illustrated a typical environment in which the pre-insulated piping systems of the invention might be employed. FIG. 1 shows a school campus having a number of isolated buildings 31, 33 connected by an underground insulated pipeline 35 carrying steam which at points includes right angle loops or elbows 37. The U-shaped bend 37 is provided for the purpose of allowing the pipe to expand and contract without producing an unacceptable level of stress in the pipe, pipe fittings, or attachment points for the pipe.

FIGS. 2 and 3 are schematic views of the standard piping installation of the type under consideration designated generally as 39. The installation 39 includes a number of coaxially oriented lengths of pipe, such as length 55 (shown broken away in FIG. 2). The installation may also include a number of angled fittings such as the right angle elbows (generally shown as 41) in FIG. 2. Each length of pipe includes an inner pipe 11, typically formed of steel, an envelope of foamed insulation 15 surrounding the inner pipe and outer protective jacket 13 surrounding the envelope of insulation. The joining ends of adjacent pipe lengths are affixed, as by being welded together, to form fixed joints, whereby the adjacent pipe lengths provide a continuous fluid conduit for conveying high temperature fluids. The jacket 13 (FIG. 1) is typically formed of high density polyethylene (HDPE) or a similar polyolefin type material. The following references, among others, teach the manufacture of such prior art systems: U.S. Pat. No. 3,793,411; U.S. Pat. No. 4,084,842; and U.S. Pat. No. 4,221, 405, all to Stonitsch et al.

The piping systems of the type illustrated in FIGS. 2 and 3 are sometimes utilized to convey fluids at high temperature and/or pressures. For example, a typical steam line might be conveying fluid at, for example, 400° F. The temperature differentials which exists between the piping system materials and the fluid being conveyed can cause a force ("F" in FIG. 2) to be applied along the coaxially aligned pipes lengths. As mentioned earlier, these U-shaped bends 39 in a piping system are provided for the purpose of allowing the pipe to expand and contract without producing an unacceptable level of stress in the pipe, pipe fittings, or attachment points for the pipe. However, the greatest amount of stress in the pipe is located just prior to the first angle in the expansion loop, shown generally at 43 in FIG. 3.

In the piping system illustrated in FIG. 2, the longitudinal runs of pipe in the system are displacing as a unit and moving axially in the surrounding soil. This movement does not damage the jacketing or the foam of the system because they are both incrementally being pulled along throughout the entire length of the straight run. Because of this monolithic movement no one individual section of the jacket is over stressed and thereby ruptured, and no one individual section of the foam is required to support the entire force of the thermal expansion of the pipe. The bond distributes these forces along each incremental length of the entire run. It will be understood, however, that should the forces become great enough, disbondment of the foam from the carrier pipe can occur. If the carrier is free to move independently from the foam and jacket (disbondment has occurred) then the surrounding soil will fix the jacket in place and the carrier pipe will burst through the foam and jacket in areas shown generally as 43 in FIG. 3. Failure of the surrounding insulated layers allows water or other contaminants to contact the steel pipe, leading to increased corrosion and joint failure in some cases.

The present invention is intended to provide a solution for possible disbondment problems for foam bonded piping systems that are operating at temperatures generally above about 200° F. At temperatures that begin to exceed 250° F., foams have been developed that are stable structurally to handle these higher temperatures, but the bond strength of the foams at these temperatures may come into question. The invention is intended to prevent the potential problems that might occur if the foam bond strength is not sufficient to cause the systems to expand as one monolithic item.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy conveying pipes, open or closed cell polyurethane, polyisocyanurate, polystyrene or the like, foamed rigid insulation and polypropylene, polybutylene, polyethylene, polyvinylchloride and similar protective jackets.

The present invention is an improvement to presently available pre-insulated piping of the type which is commercially available and familiar to those in the relevant industries. Prior art pipe lengths of this general type are commercially available as standard factory type product. For example, such products are available from Thermacor Process, LP of Fort Worth, Tex., assignee of the present invention. One typical example is sold commercially as the HT-406 High Temp Steel Piping System. The published specifications for systems are as follows:

| | |
|---|---|
| Carrier Pipe- | |
| diameter less than about 2" | A53 ERW Grade B, Std. Wt. Black Steel |
| diameter greater than about 2" | A106 SML, Std. Wt. Black Steel |
| HDPE Jacket- | |
| Compatible with ASTM D3350 | |
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |
| Impact Strength (ASTM D256) | 2.0 ft. lb/in. North Min. |
| Rockwell Hardness (ASTM D785) | D60 (Shore) min. |
| Polyisocyanurate Insulation- | |
| Density | >2.4 lbs/ft$^3$ |
| "K" Factor | ≦0.14 @ 70° F., ≦0.24 @ 406° F. |
| Compressive Strength | >30 psi |
| Closed Cell Content | ≧90% |
| Minimum Thickness | ≧2.5" @ 366° F., ≧3.0" @ 406° F. |

The present invention addresses the problem of foam disbondment by helping insure that the inner carrier pipe and outer layer of bonded foam continue to move as a unit as the inner pipe expands. This object is accomplished by providing an "external slip wrap" which surrounds the outer protective jacket of the piping system at selected locations. The external slip wrap is a sleeve formed of a flexible polyolefin material having a desired characteristic coefficient of friction. Since the external wrap is not bonded to the protective jacket, the insulated and jacketed pipe can move axially relative to the slip wrap in the earth for a selected distance once the pipe is buried in the ground. It is important to note, the external slip wrap is not intended to further insulate or waterproof the piping system, as that is already handled by the foam and outer protective jacket respectively. Instead, the function of the external slip wrap is to allow movement of the insulated pipe by providing a slidable environment that normally would not exist when the surrounding earth is holding the protective jacket in place.

Figure 5:
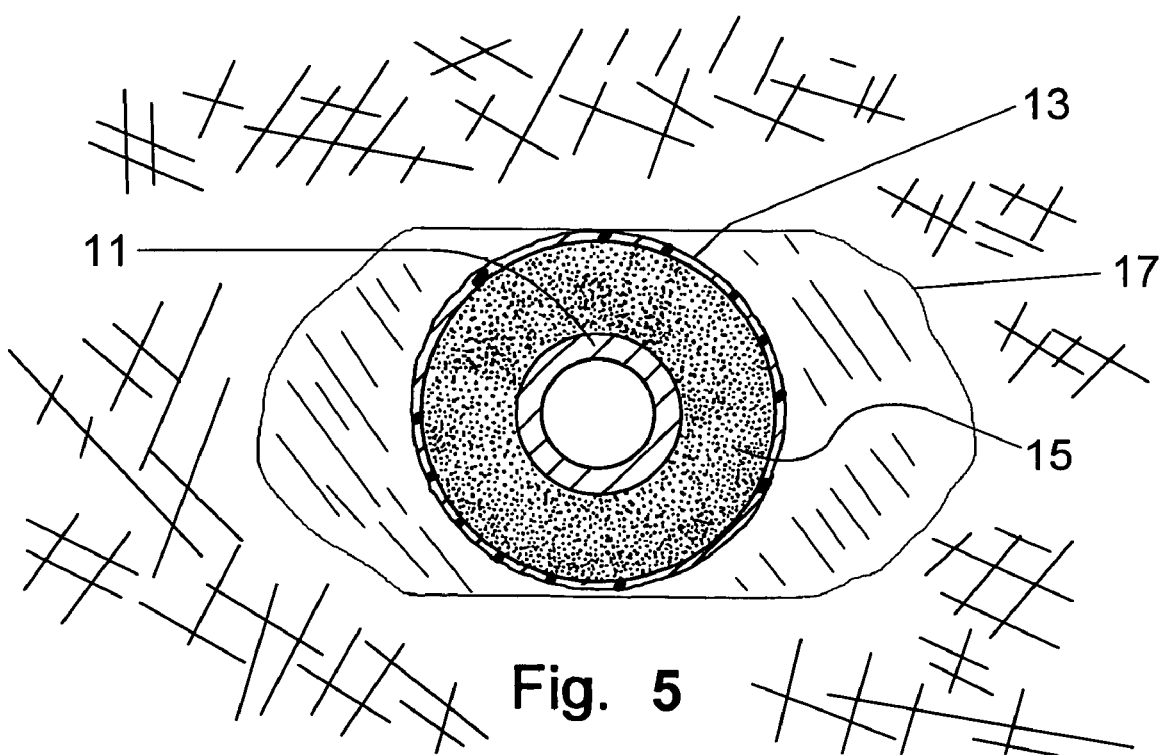
FIG. 5 is an end view, partly in section, of an underground bonded foam insulated pipe showing the external slip wrap of the present invention surrounding the pipe at a selected location along the length thereof.

The external slip wrap of the invention is designated generally as 17 in FIG. 5. The wrap 17 is intended to be used in any coaxially aligned piping system of the type previously described and has particular application where the lengths encounter an angular bend or turn, such as the elbow 41 (FIG. 2). The slip wrap 17 is particularly advantageous in countering the harmful effects of coaxial stresses which are often encountered in a "high temperature" insulated piping system. The term "high temperature" is intended to encompass any temperature above ambient which would tend to cause the type of damage to the surrounding insulating layers of the piping system discussed with respect to FIGS. 1-3 above. Typically, such temperatures will be above about 200° F., and in some cases temperatures of 400° and higher will be encountered.

Figure 4:
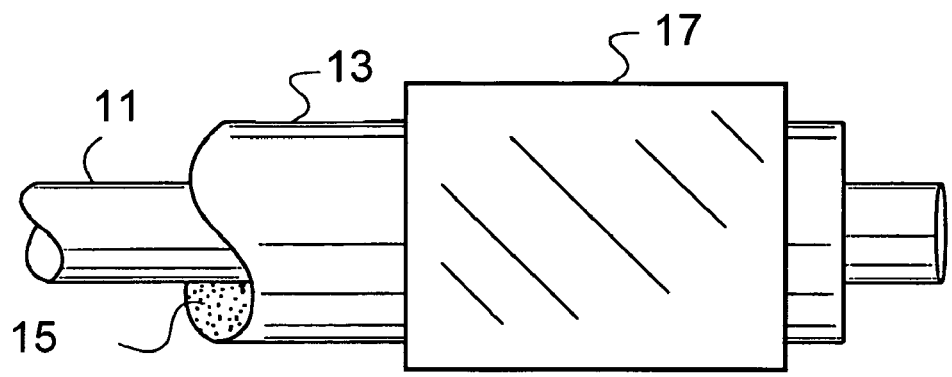
FIG. 4 is a simplified side view of a bonded foam insulated pipe showing the inner carrier pipe, surrounding layer of foam, and outer polyolefin jacket and showing the external slip wrap of the present invention surrounding the polyolefin jacket.

The preferred external slip wrap 17 of the invention is a thin sleeve formed of a flexible material, such as a suitable polyethylene material. As shown in FIG. 4, it fits as a sleeve around the protective jacket 13 of the pipeline 35 and is typically installed at a location which precedes a turn in a U-shaped expansion loop 37 in the piping system. As has been described, each pipe length comprises an inner pipe 11, an envelope of foamed insulation 15 surrounding the inner pipe and an outer protective jacket 13 surrounding the envelope of insulation. In the particular embodiment of the invention illustrated in FIG. 5, the surrounding foam insulation layers 15 are typically polyurethane closed cell foam insulation for systems of up to about 250° F. and polyisocyanurate foam insulation for systems above 250° F. The surrounding jacket 13 is a polyolefin, preferably HDPE. The pipe lengths 11 can be standard factory type product of the kind described above and available from Thermacor Process, LP of Fort Worth, Tex.

FIG. 5 is intended to be a simplified view of what the external slip wrap would look like in position at a selected location surrounding the insulated pipeline with a layer of earth surrounding the complete assembly. Note that the force of the earth generally compresses the polyethylene sleeve 17 downwardly onto the top and bottom of the pipeline (generally at 13).

In the particular system illustrated in FIGS. 4 and 5, the external slip wrap 17 surrounds the inner pipe 11 for about six feet prior to the first angle in the expansion loop in the pipe system. The greatest amount of stress is now thought to occur at the location immediately before the U-shaped expansion loop 37, as shown by location 43. The pressure force "F" causes the pipeline to bend inwardly, as drawn in phantom in FIG. 3. Disbondment of the foam insulation 15 from the inner carrier pipe 11 may occur in some situations.

However, because the external slip wrap allows the insulated and jacketed pipe to move axially relative to the wrap for a selected distance once the pipe is buried in the ground, the outer jacket remains intact and the integrity of the foam insulation is not disrupted. Since the insulating layer remains intact, water or other contaminants are prevented from reaching the inner steel pipe, thereby extending the useful life of the pipeline.

An invention has been provided with several advantages. The external slip wrap of the invention alleviates problems previously encountered with high temperature piping systems where elbows and other angled fittings caused the pipe to be subjected to damaging stresses. The system incorporates several existing, commercially available materials or components, thereby simplifying manufacture and assembly. The particular application of the slip wrap of the system compensates for relative movement of the inner steel pipe which could disrupt the continuity of the surrounding insulating layer at an elbow or other fitting. The coupling is simple in design and economical to implement in a variety of industrial applications.

What is claimed is:

1. An insulated piping system for conveying high temperature fluids, comprising:
   a first and second length of insulated and jacketed pipe, each having a joining end to be joined to an end of the other length, each pipe length comprising an inner carrier pipe having an interior surface and an exterior surface, an envelope of foamed insulation surrounding the inner pipe exterior surface, and an outer protective jacket surrounding the envelope of insulation, the joining ends of adjacent pipe lengths being welded together to form fixed joints, whereby the adjacent pipe lengths provide a continuous length of fluid conduit for conveying high temperature fluids;
   a discrete length of an external slip wrap located at a selected location along the length of the piping system at which location the piping encounters an angular shaped change in direction, the slip wrap comprising a loosely received outer sleeve for the piping which surrounds the outer protective jacket without being bonded thereto, whereby the insulated and jacketed pipe can move axially relative to the slip wrap for a selected distance once the pipe is buried in the ground, the location of the external slip wrap along the length of piping being selected in order to prevent disbondment of the foam insulation from the inner carrier pipe.

2. The insulated piping system of claim 1, wherein the external slip wrap is a sleeve formed of a flexible polyolefin material having characteristic coefficient of friction which allows the jacketed pipe to slide within the sleeve.

3. The insulated piping system of claim 2, wherein the external slip wrap is formed of polyethylene.

4. The insulated piping system of claim 3, wherein the inner carrier pipes are metal pipes and wherein the location of the slip wrap along the length of piping is selected to prevent disbondment of the foam insulation from the inner carrier pipe would otherwise occur by preventing separation of the envelope of foamed insulation from the exterior surface of the inner metal pipes as the temperature of the inner metal pipes increase.

5. The insulated piping system of claim 4, wherein the foam insulation is selected from the group consisting of polyurethane foams and polyisocyanurate foam.

6. The insulated piping system of claim 4, wherein the outer protective jackets of the insulated and jacketed pipe are formed from a synthetic polyolefin.

7. The insulated piping system of claim 4, wherein the slip wrap is installed at a location which precedes a U-shaped expansion loop in the piping system.

8. The insulated piping system of claim 4, wherein the lengths of insulated piping being joined are part of a pipeline conveying steam, hot water or other hot fluids at a temperature in the range of above about 200° F.

9. A method of coupling lengths of insulated piping used to form a high temperature fluid conveyance system, the method comprising the steps of:

providing a first and second length of insulated and jacketed pipe, each having a joining end to be joined to an end of the other length, each of the first and second lengths of pipe comprising an inner pipe, an envelope of foamed insulation surrounding the inner pipe and an outer protective jacket surrounding the envelope of insulation;

the joining ends of adjacent pipe lengths being welded together to form fixed joints, whereby the adjacent pipe lengths provide a continuous length of fluid conduit for conveying high temperature fluids;

wrapping selected locations along the piping system with a discrete length of an external slip wrap, the location which is selected being a point in the piping at which the piping encounters an elbow shaped change in direction, the slip wrap comprising a loosely received outer sleeve for the piping which surrounds the outer protective jacket without being bonded thereto, whereby the insulated and jacketed pipe can move axially relative to the slip wrap for a selected distance once the pipe is buried in the ground, the location of the external slip wrap along the length of piping being selected in order to prevent disbondment of the foam insulation from the inner carrier pipe.

10. The method of claim 9, wherein the foam insulation which is used to surround the inner pipes is selected from the group consisting of polyurethane foam and polyisocyanurate foam.

11. The method of claim 9, wherein the protective jackets are formed of HDPE.

12. The method of claim 9, wherein the slip wrap is installed at a location which precedes a U-shaped expansion loop in the piping system.

13. The method of claim 9, wherein the lengths of insulated piping being joined are part of a pipeline conveying steam at a temperature of 400 degrees F. or greater.

* * * * *